US012771536B2

(12) United States Patent
Xu et al.

(10) Patent No.: US 12,771,536 B2
(45) Date of Patent: Oct. 20, 2026

(54) BLOCKCHAIN-BASED KEY GENERATION METHOD AND APPARATUS

(71) Applicant: Tencent Technology (Shenzhen) Company Limited, Shenzhen (CN)

(72) Inventors: Dan Xu, Shenzhen (CN); Kun Wu, Shenzhen (CN); Neng Wang, Shenzhen (CN); Yongxin Yao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 65 days.

(21) Appl. No.: 19/051,544

(22) Filed: Feb. 12, 2025

(65) Prior Publication Data

US 2025/0184130 A1 Jun. 5, 2025

Related U.S. Application Data

(63) Continuation of application No. PCT/CN2023/124248, filed on Oct. 12, 2023.

(30) Foreign Application Priority Data

Feb. 3, 2023 (CN) ........................ 202310131485.7

(51) Int. Cl.
*H04L 9/08* (2006.01)
*H04L 9/00* (2022.01)
*H04L 9/30* (2006.01)

(52) U.S. Cl.
CPC .......... *H04L 9/0866* (2013.01); *H04L 9/0894* (2013.01); *H04L 9/3066* (2013.01); *H04L 9/50* (2022.05)

(58) Field of Classification Search
CPC ....... H04L 9/0866; H04L 9/0894; H04L 9/50; H04L 9/3066
See application file for complete search history.

(56) References Cited

U.S. PATENT DOCUMENTS 10,903,991 B1 * 1/2021 Craige .................... H04L 9/085
11,928,188 B1 * 3/2024 McCown ................. H04L 9/50
(Continued)

FOREIGN PATENT DOCUMENTS

CN 110291756 A 9/2019
CN 114826592 A 7/2022
(Continued)

OTHER PUBLICATIONS

International Search Report and Written Opinion issued in international application No. PCT/CN2023/124248 dated Dec. 19, 2023, 8 pages (with English translation).

*Primary Examiner* — Vance M Little
(74) *Attorney, Agent, or Firm* — Crowell & Moring LLP

(57) ABSTRACT

This disclosure relates to a blockchain-based key generation method and apparatus. The method includes: generating a first proposal request, the first proposal request comprising key generation information and a negotiation node list; broadcasting the first proposal request to each of the consensus nodes in the blockchain such that each of the negotiation nodes generates commitment information and an auxiliary shard for each consensus node based on the key generation information; receiving the commitment information transmitted by the negotiation node and the auxiliary shard generated by the negotiation node; generating, based on the commitment information and the auxiliary shard generated, a negotiation key; and transmitting voting information to a second master node such that the second master node generates a second proposal request based on the voting information, the second proposal request being for triggering the consensus node in the blockchain to enable the negotiation key.

20 Claims, 5 Drawing Sheets

(56) References Cited

U.S. PATENT DOCUMENTS

| | | | | |
|---|---|---|---|---|
| 2019/0318356 | A1* | 10/2019 | Martin | G06F 21/6209 |
| 2022/0038264 | A1 | 2/2022 | Yakira et al. | |
| 2022/0311607 | A1* | 9/2022 | Li | H04L 9/0838 |
| 2023/0179409 | A1* | 6/2023 | Camenisch | H04L 9/0819 713/171 |
| 2024/0121098 | A1* | 4/2024 | Herder, III | H04L 9/3255 |

FOREIGN PATENT DOCUMENTS

| | | | |
|---|---|---|---|
| EP | 3993318 | A1 | 5/2022 |
| KR | 102090723 | B1 | 3/2020 |
| WO | WO 2019/232789 | A1 | 12/2019 |

* cited by examiner

BLOCKCHAIN-BASED KEY GENERATION METHOD AND APPARATUS

RELATED APPLICATION

This application is a continuation application of PCT Patent Application No. PCT/CN2023/124248, filed on Oct. 12, 2023, which claims priority to Chinese Patent Application No. 202310131485.7, filed on Feb. 3, 2023, wherein the content of the above-referenced applications is incorporated herein by reference in its entirety.

FIELD OF THE TECHNOLOGY

This disclosure relates to the field of computer technologies, and relates to, but is not limited to, a blockchain-based key generation method and apparatus, an electronic device, a non-transitory computer-readable storage medium, and a computer program product.

BACKGROUND OF THE DISCLOSURE

In a consensus process of a blockchain, a threshold signature is commonly used to address a security risk such as an encryption failure when a key is lost, misuse of node authority, or a node being controlled by an attacker as a result of excessive authority of a single node. The characteristic of the threshold signature is that a signature is definitely generated by a private key. However, the private key is not fully held by any single party, but is divided into many fragments in some way. These fragments may be held by a plurality of persons at the same time, and then through a protocol, it is ensured that these fragments do not need to be all put together to directly generate a valid signature.

In the related art, the blockchain issues a threshold key shard for each consensus node, thereby allowing the consensus node to perform encryption consensus by using the threshold signature in the consensus process.

However, in the foregoing solution, the threshold key shard is usually generated and distributed by a master node based on a situation of the consensus node in the blockchain. Once the master node is subjected to key exposure or attack, resulting in exposure of all threshold key shards, the entire authentication system may fail, and security and stability of the blockchain are affected.

SUMMARY

Embodiments of this disclosure provide a blockchain-based key generation method and apparatus, an electronic device, a non-transitory computer-readable storage medium, and a computer program product, which can improve operating efficiency and stability of a blockchain.

Technical solutions in the embodiments of this disclosure are implemented as follows.

An embodiment of this disclosure provides a blockchain-based key generation method, including:

generating a first proposal request, the first proposal request comprising key generation information and a negotiation node list, negotiation nodes in the negotiation node list being determined from consensus nodes of the blockchain;

broadcasting the first proposal request to each of the consensus nodes in the blockchain such that each of the negotiation nodes generates commitment information and an auxiliary shard for each consensus node based on the key generation information;

receiving the commitment information transmitted by the negotiation node and the auxiliary shard generated by the negotiation node for the first master node;

generating, based on the commitment information and the auxiliary shard generated for the first master node, a negotiation key used by the first master node in the blockchain;

transmitting voting information to a second master node such that the second master node generates a second proposal request based on the voting information, the second proposal request being for triggering the consensus node in the blockchain to enable the negotiation key.

An embodiment of this disclosure provides a blockchain-based key generation apparatus running on a first master node in a blockchain, including: a memory operable to store computer-readable instructions; and a processor circuitry operable to read the computer-readable instructions, the processor circuitry when executing the computer-readable instructions is configured to:

generate a first proposal request, the first proposal request comprising key generation information and a negotiation node list, negotiation nodes in the negotiation node list being determined from consensus nodes of the blockchain;

broadcast the first proposal request to each of the consensus nodes in the blockchain such that each of the negotiation nodes generates commitment information and an auxiliary shard for each consensus node based on the key generation information;

receive the commitment information transmitted by the negotiation node and the auxiliary shard generated by the negotiation node for the first master node;

generate, based on the commitment information and the auxiliary shard generated for the first master node, a negotiation key used by the first master node in the blockchain; and transmit voting information to a second master node such that the second master node generates a second proposal request based on the voting information, the second proposal request being for triggering the consensus node in the blockchain to enable the negotiation key.

An embodiment of this disclosure provides a non-transitory machine-readable media, having instructions stored on the machine-readable media. When being executed, the instructions are configured to cause a machine to:

generate a first proposal request, the first proposal request comprising key generation information and a negotiation node list, negotiation nodes in the negotiation node list being determined from consensus nodes of a blockchain;

broadcast the first proposal request to each of the consensus nodes in the blockchain such that each of the negotiation nodes generates commitment information and an auxiliary shard for each consensus node based on the key generation information;

receive the commitment information transmitted by the negotiation node and the auxiliary shard generated by the negotiation node;

generate a negotiation key based on the commitment information and the auxiliary shard generated; and transmit voting information to a second master node such that the second master node generates a second proposal request based on the voting information, the second proposal request being for triggering the consensus node in the blockchain to enable the negotiation key.

In the embodiments of this disclosure, the key is regenerated through key negotiation during key generation. In other words, the negotiation key is generated by performing key negotiation between the first master node and the consensus node in the blockchain. During generation of the negotiation key, the first proposal request including the key generation information and the negotiation node list is broadcast to the consensus node in the blockchain through the first master node, and then after the commitment information and the auxiliary shard of the negotiation node are obtained, the negotiation key may be generated through a key negotiation mechanism based on the commitment information and the auxiliary shard. In this way, the key negotiation process is combined with the blockchain consensus process, thereby ensuring that no conflict occurs between a process of regenerating the key during the key negotiation and a block proposal uploading process. In addition, it can also be ensured that a block uploading failure is not caused even if a conflict occurs between the two processes, thereby improving operating efficiency and stability of the blockchain.

BRIEF DESCRIPTION OF THE DRAWINGS

Accompanying drawings herein are incorporated into the specification and constitute a part of this specification, show embodiments that conform to this disclosure, and are used for explaining the principle of this disclosure together with this specification. Apparently, the accompanying drawings described below are merely some embodiments of this disclosure, and a person of ordinary skill in the art may further obtain other accompanying drawings according to these accompanying drawings without creative efforts. In the accompanying drawings.

DESCRIPTION OF EMBODIMENTS

Figure 1:
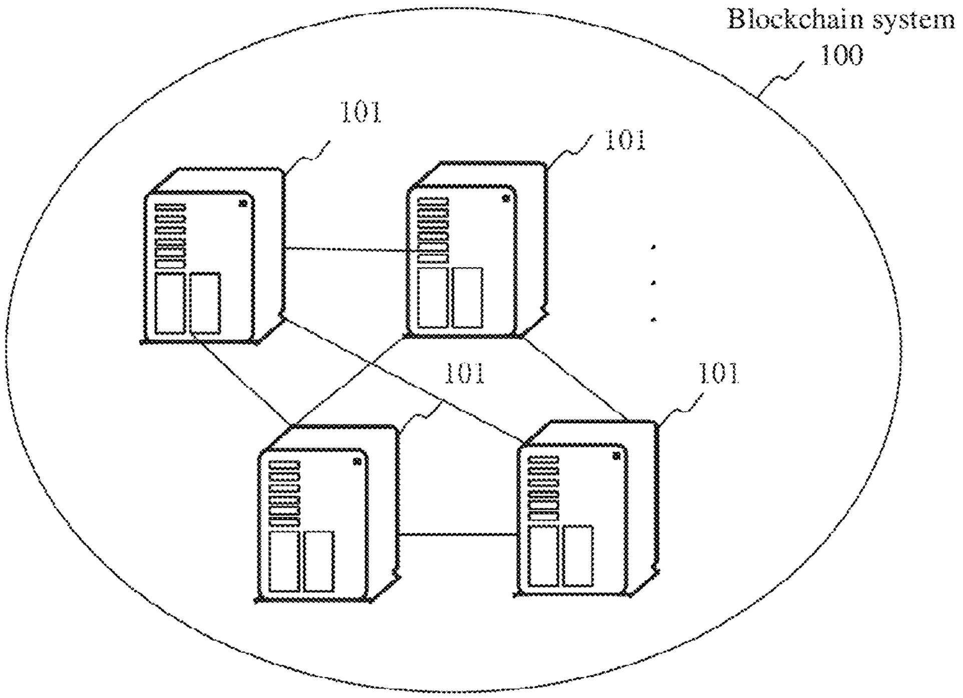
FIG. 1 is a schematic diagram of an implementation environment according to an embodiment of this disclosure.

Exemplary implementations are described more comprehensively with reference to the accompanying drawings. However, the example implementations may be implemented in a plurality of forms, and are not to be construed as being limited to examples described herein. On the contrary, these implementations are provided so that this disclosure is more comprehensive and complete and to fully convey the concept of the example implementations to a person skilled in the art.

In addition, the described features, structures, or characteristics may be combined in one or more embodiments in any proper manner. In the following descriptions, many specific details are provided for comprehensive understanding of the embodiments of this disclosure. However, a person of ordinary skill in the art is to be aware that, the technical solutions in this disclosure may be implemented without one or more of the particular details, or may be implemented by using another method, unit, apparatus, operation, or the like. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. To be specific, the functional entities may be implemented in a software form, or in one or more hardware modules or integrated circuits, or in at least one of different networks, processor apparatuses, and microcontroller apparatuses. The flowcharts shown in the accompanying drawings are merely exemplary descriptions, and do not necessarily include all content and operations/blocks, nor do they have to be executed in the described order. For example, some operations/blocks may further be broken down, but some operations/blocks may be merged or partially merged. Therefore, an actual execution order may change according to an actual situation.

A blockchain-based key generation method in the embodiments of this disclosure may be applied to a scenario in which threshold encryption is performed in a blockchain, and may be applied to a scenario in which each node in the blockchain generates a threshold password. In such scenarios, to perform threshold encryption, each consensus node participating in a consensus process needs to be assigned a corresponding negotiation public/private key and a master public key shared by each consensus node. For a blockchain system, a key for a threshold signature includes a master public key and a set of public/private key pairs belonging to each consensus node. Each consensus node uses a private key shard thereof to sign for a vote cast by the consensus node. A master node does not need to verify signatures for votes one by one while collecting the votes. Instead, after more than a threshold quantity (a threshold value being specified when a threshold signature key is generated, and assuming that a total quantity of consensus nodes is n, the threshold value being generally set to $\frac{2}{3}n+1$ in a hotStuff consensus) of votes are collected, the master node synthesizes a signature, which may be considered as being written through a logical master private key, from more than a threshold quantity of signature shards carried in the votes, and then verifies the signature once by using the master public key. If the synthesized signature is validated, the signatures of all the votes are considered valid. Otherwise, public key shards of a voting party need to be used to verify signature shards of the votes one by one for all received votes. It may be learned from a principle and a usage manner of the threshold signature that keys of all consensus nodes participating in threshold signature need to be uniformly generated. Each consensus node needs to maintain a public key shard and a private key shard thereof.

In addition, all consensus nodes need to maintain a master public key of this set of threshold signature keys.

An algorithm for the threshold signature includes a "distribute key generation (DKG)" protocol. The protocol is intended to optimize a centralized key generation process into a process of generation through negotiation by a threshold quantity of nodes, thereby preventing a certain node from possessing all private key shards. The overall idea of the DKG protocol is that a threshold quantity of nodes are selected from n nodes as "threshold key negotiators" to participate in negotiation of a set of threshold signature keys. By using a cryptographic algorithm, a negotiator may calculate a "public commitment" thereof and generate an "auxiliary shard" for each node participating in the threshold signature. Then the negotiator transmits the public commitment thereof and the auxiliary shard generated for each node to another party separately. Any node participating in the threshold signature can synthesize a threshold signature key shard thereof through calculation as long as the node collects public commitments of all negotiators and auxiliary shards generated by the negotiators for the node.

In a consensus process of a blockchain, a threshold signature is commonly used to address a security risk such as an encryption failure when a key is lost, misuse of node authority, or a node being controlled by an attacker as a result of excessive authority of a single node. The characteristic of the threshold signature is that a signature is definitely generated by a private key. However, the private key is not fully held by any single party, but is divided into many fragments in some way. These fragments may be held by a plurality of persons at the same time, and then through a protocol, it is ensured that these fragments do not need to be all put together to directly generate a valid signature.

In the related art, the blockchain issues a threshold key shard for each consensus node, thereby allowing the consensus node to perform encryption consensus by using the threshold signature in the consensus process.

However, in the foregoing solution, the threshold key shard is usually generated and distributed by a master node based on a situation of the consensus node in the blockchain. Once the master node is subjected to key exposure or attack, resulting in exposure of all threshold key shards, the entire authentication system may fail, and security and stability of the blockchain are affected.

Based on such problems, an embodiment of this disclosure proposes a blockchain-based data processing method. A blockchain is a new application mode of computer technologies such as distributed data storage, point-to-point transmission, a consensus mechanism, and an encryption algorithm. The blockchain, in essence, is a decentralized database, and includes a series of data blocks generated associatively through a cryptographic method. Each data block includes information about a batch of network transactions, which is configured to verify effectiveness of the information (anti-counterfeiting) and generate a next block. The blockchain may include an underlying blockchain platform, a platform product service layer, and an application service layer.

The underlying blockchain platform may include processing modules such as a user management module, a basic service module, a smart contract module, and an operation management module. The user management module is responsible for identity information management of all blockchain participants, including maintenance of public/private key generation (account management), key management, maintenance of a correspondence between a real user identity and a blockchain address (authority management), and the like. In addition, when authorized, the user management module monitors and audits transactions of some certain real identities, and provides risk control rule configuration (risk control audit). The basic service module is deployed on all blockchain node devices to verify effectiveness of a business request and record the effective request in a storage after a consensus is reached on the service request. For a new business request, the basic service module first performs adaptation analysis and authentication on an interface (interface adaptation), and then encrypts business information through a consensus algorithm (consensus management), transmits the encrypted business information to a shared ledger (network communication) in a complete and consistent manner after encryption, and records and stores the encrypted business information. The smart contract module is responsible for registration, issuance, triggering, and execution of a contract. A developer may define a contract logic through a specific programming language, publish the contract logic on the blockchain (contract registration), call a key or another event to trigger execution based on a logic of contract terms, complete the contract logic, and provide functions of contract upgrading and canceling. The operation management module is mainly responsible deployment, configuration modification, contract setting, and cloud adaptation during product release, and visualized outputs of a real-time status such as warning, management of a network status, and management of a node device health status during product running.

The platform product service layer provides basic capabilities and implementation frameworks for typical applications. The developer may superimpose characteristics of business based on these basic capabilities, thereby completing implementation of the business logic on the blockchain. The application service layer provides application services based on blockchain solutions for business participants to use.

FIG. 1 is a schematic diagram of an implementation environment according to an embodiment of this disclosure. FIG. 1 shows a blockchain system. The blockchain system 100 refers to a system for performing data storage between nodes. The blockchain system may include a plurality of nodes 101. Each of the plurality of nodes 101 may refer to each client in the blockchain system. During normal operation, each node 101 may receive input information, and maintain transaction data within the blockchain system 100 based on the received input information. To ensure information exchange within the blockchain system 100, an information connection may exist between the nodes in the blockchain system 100. Information may be transmitted between the nodes through the information connection. For example, when any node in the blockchain system 100 receives input information, another node in the blockchain system 100 obtains the input information based on a consensus algorithm, and stores the input information as data in shared data, so that data stored on all nodes in the blockchain system 100 is consistent. Each node can be a terminal device or a server. The server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform, which is not limited herein. The terminal device may be a mobile phone, a computer, an intelligent voice interaction device, a smart home appliance, an on-board terminal, an aircraft, and the like, but is not limited thereto. The terminal device and the server may be directly or indirectly connected through wired or wireless communication, which is not limited in this embodiment of this disclosure. A quantity of terminal devices and a quantity of servers are not limited either.

Figure 2:
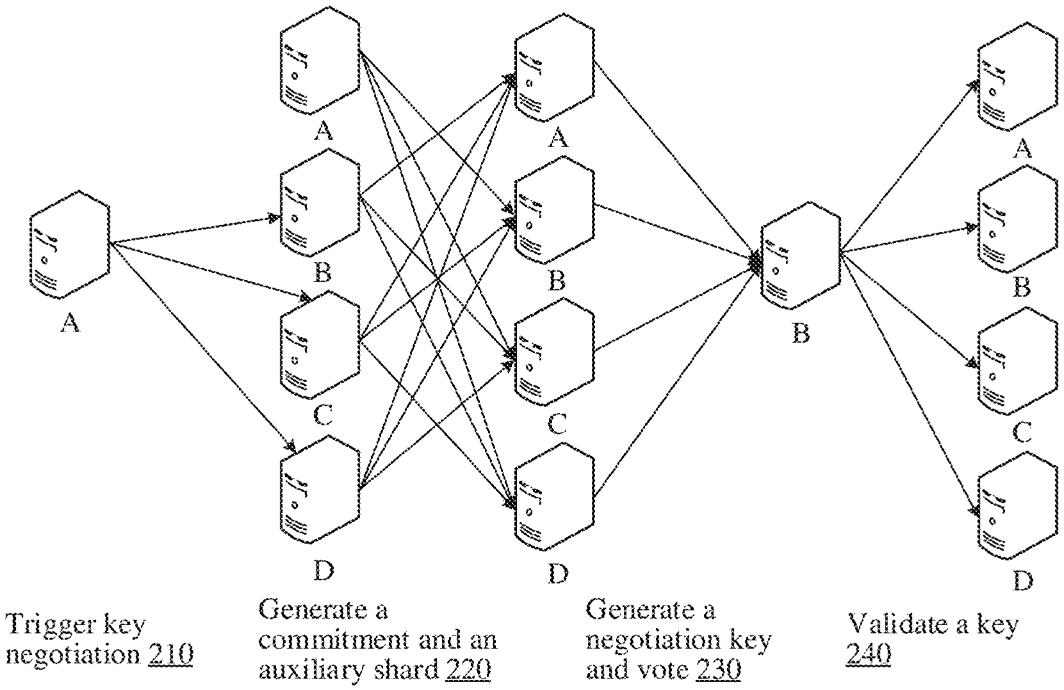
FIG. 2 is a schematic diagram of an overall process of a blockchain-based key generation method according to an embodiment of this disclosure.

In this embodiment of this disclosure, a distributed generation process of a threshold key is embedded in a consensus process, and a private/public key for threshold cryptography is generated by the consensus nodes in the blockchain system through joint negotiation. The consensus nodes jointly perform the method described in this embodiment of this disclosure to generate a corresponding negotiation key. FIG. 2 is a schematic diagram of an overall process of a blockchain-based key generation method according to an embodiment of this disclosure. As shown in FIG. 2, the key generation method generally includes four parts: triggering key negotiation 210, generating a commitment and an auxiliary shard 220, generating a negotiation key and voting 230, and validating a key 240. A total of four consensus nodes (which are respectively A, B, C, and D) exist in FIG. 2. In a stage of triggering key negotiation 210, a master node in this case is the consensus node A. When constructing a proposal and packaging a block, the consensus node A perceives that a set of new threshold keys needs to be generated, and the consensus node A constructs a key generation request. The consensus node A attaches the constructed key generation request to a newly generated proposal request. To avoid affecting normal transaction processing, the block in the proposal request is no longer to package a client transaction, but is only configured to process information related to key generation. The consensus node A broadcasts the proposal request to all the remaining consensus nodes (i.e., the consensus nodes B, C, and D). In a stage of generating the commitment and the auxiliary shard 220, each of the consensus nodes B, C, and D received a proposal request and found that a key generation request is carried in the proposal request. If the consensus nodes B and C learn from key generation request information carried in the proposal request that the consensus nodes B and C are negotiators for a current round of key generation, the consensus nodes B, C, and D invoke a method, input the key generation information, calculate commitments thereof, and generate auxiliary shards respectively for the consensus nodes A, B, C, and D. As the negotiators for key generation, the consensus nodes B, C, and D transmit the commitment information thereof and the auxiliary shards generated for each node to a corresponding node. In a stage of generating a negotiation key and voting 230, each consensus node receives the commitment information and the auxiliary shards, and generates a negotiation key based on the received information and votes on whether to apply the negotiation key. Assuming that the consensus nodes A and B have received the auxiliary shards generated by all negotiators (the consensus nodes A, B, and C) for themselves and the commitment information thereof, successfully synthesize a negotiation key, and save private information to a local file system, then the consensus nodes A and B may cast positive votes for the proposal request. If the consensus node C fails to receive the commitment information from the consensus node B and the auxiliary shard generated by the consensus node B for the consensus node C within a limited time due to various reasons such as a network, the consensus node C casts a negative vote for the proposal request. Assuming that the consensus node D successfully synthesizes the negotiation key, but fails to save the private information to the local file system due to a local reason, then the consensus node D also casts a negative vote for the proposal request due to being unable to use the negotiation key generated in the current round. In a stage of validating a key 240, it is assumed that a threshold quantity of nodes successfully synthesize a negotiation key and cast positive votes, a next master node (assuming that the master node is the consensus node B) may synthesize a valid voting result and generate a proposal request based on the voting result. In the proposal request, public information for the current round of key generation is constructed as uploading data. After the proposal request is submitted, each consensus node may enable a new threshold key based on uploading information and the information stored in the local file system.

The method provided in this embodiment of this disclosure may be writing a program to serve as a processing logic in a hardware system, or may serve as a blockchain-based key generation apparatus to implement the foregoing processing logic in an integrated or external manner. In an implementation, the key negotiation process is combined with the blockchain consensus process, to avoid a block uploading failure as a result of a conflict between a process of regenerating the key during the key negotiation and a block proposal uploading process, thereby improving operating efficiency and stability of the blockchain.

In FIG. 2, four consensus nodes are used as an example, but a quantity of nodes is only used as an example. The quantity of consensus nodes in actual implementation is not limited.

Figure 3:
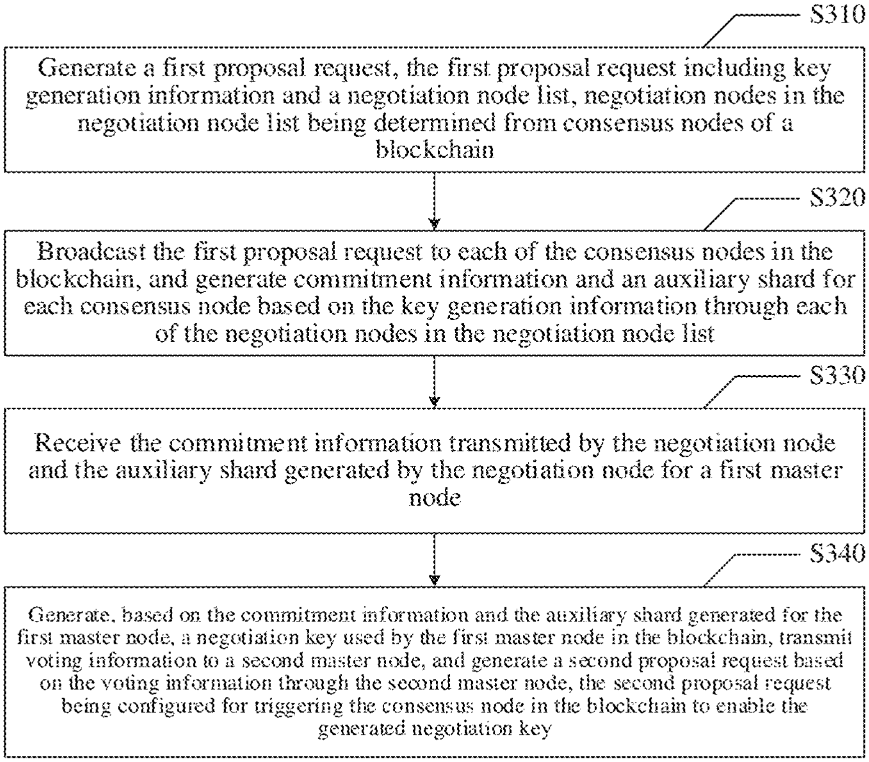
FIG. 3 is a schematic flowchart of a blockchain-based key generation method according to an embodiment of this disclosure.

The blockchain-based key generation method in this embodiment of this disclosure is further described below. The blockchain-based key generation method in this embodiment of this disclosure may be performed by a first master node. In other words, the blockchain-based key generation method in this embodiment of this disclosure is implemented through the first master node. FIG. 3 is a schematic flowchart of a blockchain-based key generation method according to an embodiment of this disclosure. As shown in FIG. 3, the blockchain-based key generation method includes at least operation S310 to operation S340. A detailed description is as follows.

Operation S310: Generate a first proposal request, the first proposal request including key generation information and a negotiation node list, negotiation nodes in the negotiation node list being determined from consensus nodes of a blockchain.

A master node is a node in a blockchain that is configured to upload a block proposal. In this embodiment of this disclosure, the consensus nodes in the blockchain serve as the master node in the blockchain in turn. After becoming the master node, each consensus node starts to continuously try to package and generate a new block to make a proposal. If a state in the blockchain does not meet a condition for making a proposal during an attempt to make a proposal, for example, a transaction that needs to be packaged does not meet a requirement for a quantity of transactions in a block, the master node gives up generating the proposal and reattempts to generate a proposal until the proposal is successfully generated and broadcast, and hands over an identity of the master node to a next consensus node.

A blockchain system generates the first proposal request through a first master node. The first proposal request is a proposal request configured for performing key negotiation. When a proposal is made through the first master node, the blockchain system checks whether a change occurs in a consensus node list and checks whether a transaction for key negotiation exists in a transaction pool to be packaged. If a change in the consensus node is found or a key negotiation transaction is found, the first proposal request is generated through the first master node. The first proposal request includes the key generation information and the negotiation node list. The key generation information is information configured for generating a blockchain key, and usually includes identifier information and information (usually excluding the key generation algorithm) configured for indicating a key generation algorithm. The negotiation node list includes consensus nodes selected from the consensus node list, where the consensus nodes may be referred to as negotiation nodes. A quantity of negotiation nodes usually depends on a threshold value during threshold encryption in the blockchain. For example, if at least five nodes are required to participate in the threshold encryption, the quantity of negotiation nodes is usually greater than or equal to five nodes. The negotiation node list is selected each time a key negotiation is performed in the blockchain. The quantity of negotiation nodes and specific nodes may be different each time a key is generated.

Operation S320: Broadcast the first proposal request to each of the consensus nodes in the blockchain, and generate commitment information and an auxiliary shard for each consensus node based on the key generation information through each of the negotiation nodes in the negotiation node list.

In this embodiment, after the first proposal request is generated through the first master node, the blockchain system broadcasts the first proposal request to the consensus node in the blockchain, so that the negotiation node in the negotiation node list generates the commitment information based on the key generation information and the auxiliary shard for each consensus node. Under normal circumstances, all other consensus nodes in the blockchain are to receive the broadcast first proposal request. The consensus node receiving the first proposal request first determines that the consensus node is a negotiation node based on the negotiation node list, and then generates the commitment information and the auxiliary shard for each consensus node based on the key generation information. The commitment information is information generated by the negotiation node for authentication. The auxiliary shard is information configured for verifying the commitment information and for generating the negotiation key by the consensus node. One negotiation node generates a different auxiliary shard for each of the other consensus nodes. After receiving the commitment information and the auxiliary shard, the consensus node verifies the commitment information based on the auxiliary shard, so as to determine correct and valid information of information generated by the negotiation node.

Figure 4:
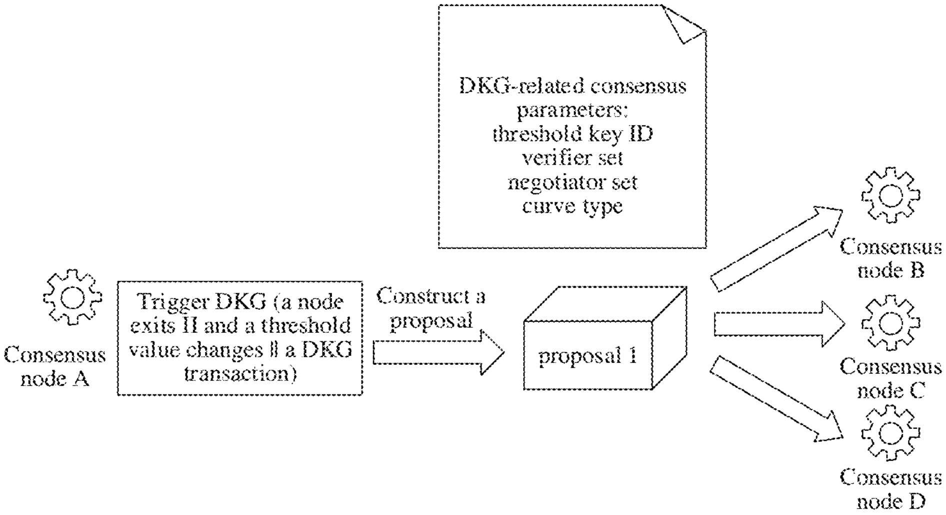
FIG. 4 is a schematic flowchart of constructing and broadcasting a proposal request according to an embodiment of this disclosure.

For ease of description, FIG. 4 is a schematic flowchart of constructing and broadcasting a proposal request according to an embodiment of this disclosure. As shown in FIG. 4, a consensus node A serves as a master node to construct a proposal by triggering a DKG process when a node exits or a threshold value changes or a DKG transaction is found in a transaction pool. A proposal request proposal1 is generated by constructing a proposal. The proposal request proposal1 includes DKG-related consensus parameters. The DKG-related consensus parameters include, but are not limited to, information such as a threshold key ID, a verifier set, a negotiator set, and a curve type. The consensus node A broadcasts the proposal request proposal1 to a consensus node B, a consensus node C, and a consensus node D.

Operation S330: Receive the commitment information transmitted by the negotiation node and the auxiliary shard generated by the negotiation node for the first master node.

A blockchain system receives, from another negotiation node through the first master node, commitment information transmitted by the another negotiation node, and the auxiliary shard generated by the negotiation node for the first master node. The first master node has completed the process of generating and broadcasting the proposal request. Therefore, the master node in the blockchain system is to have switched to another consensus node in this case, and the first master node no longer assumes a role of the master node, but participates in the subsequent key generation process as a consensus node and a negotiation node. Each negotiation node generates the commitment information and the auxiliary shard for the first master node. The first master node receives the commitment information and the auxiliary shards generated by all negotiation nodes in the negotiation node list other than the first master node. All consensus nodes in the blockchain are to receive the commitment information and the auxiliary shards transmitted by all the negotiation nodes.

Operation S340: Generate, based on the commitment information and the auxiliary shard generated for the first master node, a negotiation key used by the first master node in the blockchain, transmit voting information to a second master node, and generate a second proposal request based on the voting information through the second master node, the second proposal request being configured for triggering the consensus node in the blockchain to enable the generated negotiation key.

After the commitment information and the auxiliary shard transmitted by the negotiation node are received, the blockchain system generates the negotiation key used by the first master node in the blockchain, and transmits the voting information to the second master node. The second master node is a node other than the first master node selected by the blockchain system from the consensus nodes. Each consensus node including the first master node transmits the voting information to the second master node based on the generated negotiation key. The voting information usually includes a positive vote and a negative vote. The second master node generates the second proposal request based on the received voting information, and triggers, by broadcasting the second proposal request, the consensus node in the blockchain to enable the generated negotiation key.

In this embodiment of this disclosure, the key negotiation process is combined with the blockchain consensus process, to avoid a block uploading failure as a result of a conflict between a process of regenerating the key during the key negotiation and a block proposal uploading process, thereby improving operating efficiency and stability of the blockchain.

In some embodiments, the foregoing operation S310 of generating the first proposal request may be implemented in the following manners. First, a quantity of consensus nodes in the blockchain is detected. Then if a change in the node quantity is detected, when a proposal request is generated through the first master node, the key generation information and the negotiation node list are added to the proposal request to obtain the first proposal request.

In this embodiment of this disclosure, when the quantity of consensus nodes in the blockchain changes, a blockchain node is triggered to generate the first proposal request through the first master node. The blockchain node detects the quantity of consensus nodes in the blockchain. When the quantity of nodes changes as a result of addition or withdrawal of a consensus node, the blockchain system detects the change in the quantity of nodes, and then adds a blockchain transaction including the key generation information and the negotiation node list to a transaction pool of the first master node.

In some embodiments, a smart contract for triggering generation of the negotiation key is further added to the blockchain. The smart contract may be triggered to add the blockchain transaction including the key generation information and the negotiation node list to the blockchain. During packaging of the proposal request, the first master node recognizes that the transaction includes the key generation information and the negotiation node list, and packages the blockchain transaction, thereby adding the key generation information and the negotiation node list to the proposal request to generate the first proposal request.

In this embodiment of this disclosure, the change in the quantity of consensus nodes is detected to trigger the generation of the first proposal request, so that a consensus key in the blockchain can be updated in a timely manner, thereby reducing a possibility of a failure of reaching a consensus or consensus security caused by the change in the consensus node, and improving security of the blockchain system.

In some embodiments, in the foregoing operations, when the proposal request is generated through the first master node, the operation of adding the key generation information and the negotiation node list to the proposal request to obtain the first proposal request may further be implemented in the following manners. First, negotiation nodes are selected from the consensus nodes in the blockchain when the proposal request is generated through the first master node, to obtain a negotiation node list. Then the key generation information is obtained from the blockchain. Finally, the negotiation node list and the key generation information are added to the proposal request generated by the first master node, to obtain the first proposal request.

In this embodiment of this disclosure, when the proposal request is generated through the first master node, the blockchain system first selects the negotiation nodes from the consensus nodes in the blockchain, to obtain the negotiation node list. The negotiation node may be randomly selected from the consensus nodes, or a node number or an identifier of the negotiation node may be calculated based on a preset rule for selection. Then the blockchain system obtains the key generation information from the blockchain. The key generation information usually includes content such as identifier information for generating a key and identifier information for generating a rule. Part of the key generation information may be obtained directly from the information stored in the blockchain, and the other part of the information needs to be generated through further calculation based on data in the blockchain. The process of obtaining the key generation information is usually performed by the first master node, and the key generation information is saved to a local memory of the first master node, so that the first master node performs subsequent key generation operations. After the key generation information is obtained, the blockchain system adds the negotiation node list and the key generation information to the proposal request generated by the first master node, to obtain the first proposal request. The blockchain node generates a blockchain transaction based on the negotiation node list and the key generation information, and packages the blockchain transaction into the proposal request generated by the first master node, thereby obtaining the first proposal request. In the proposal request for performing key negotiation generation, the blockchain system or the first master node usually does not package other normal client blockchain transactions, allowing these proposal requests to be used exclusively for the process of the key negotiation generation.

In this embodiment of this disclosure, the first proposal request is generated by selecting the negotiation nodes and obtaining the key generation information, and then adding the information to the proposal request. In this way, the information required for key negotiation can be embedded into a communication process of blockchain consensus, without a need for additional process control, saving computing resources of the blockchain system and improving operating efficiency of the overall system.

In some embodiments, in the foregoing operations, the operation of selecting negotiation nodes from the consensus nodes in the blockchain when the proposal request is generated through the first master node, to obtain a negotiation node list may further be implemented in the following manners. First, node activity states of consensus nodes in the blockchain are obtained. Then nodes with a same block height and consensus stage as the first master node are selected from consensus nodes in an active state as negotiation nodes based on the node activity states of the consensus nodes in the blockchain. Generation of a key is stopped if a quantity of selected negotiation nodes is less than a threshold quantity of consensus nodes in the blockchain. A negotiation node list is generated based on the selected negotiation nodes if the quantity of selected negotiation nodes is greater than or equal to the threshold quantity of consensus nodes in the blockchain.

In this embodiment of this disclosure, the blockchain system selects the negotiation node based on an activity status, the block height, and the like of the consensus node. The blockchain system obtains the node activity status of the consensus nodes in the blockchain. The node activity status is configured for indicating an operating state of the consensus node, which usually includes an active state and an off-line state. The active state indicates that the consensus node is in a normal operating state, and the off-line state indicates that the consensus node is currently unreachable. The node activity states may further include more states, for example, a fault state for indicating presence of a consensus failure and a malicious state for indicating that the consensus node is currently untrustworthy. Based on the node activity states of the consensus nodes in the blockchain, the blockchain system first filters out the consensus nodes in the active state, and then checks the block height and consensus stage of the nodes. The block height is configured for indicating a quantity of blocks in a blockchain stored in the consensus node. However, the consensus stage is configured for indicating a section of a chained cyclic proposal consensus process which a consensus node is in during the consensus process, for example, a current consensus view of the consensus node. The blockchain node may select a consensus node with the same block height and consensus stage as the first master node as the negotiation node. If a quantity of negotiation nodes selected by the blockchain system is less than the threshold quantity of consensus nodes in the blockchain, the blockchain system determines that the current key generation fails and key generation is stopped. The threshold quantity of consensus nodes is usually determined based on a consensus-based strategy adopted among the consensus nodes. For example, in a Byzantine consensus-based strategy, the threshold quantity of consensus nodes may be equal to a quantity of consensus nodes required to reach a consensus. If the quantity of selected negotiation nodes is greater than or equal to the threshold quantity of consensus nodes in the blockchain, the blockchain system generates a negotiation node list based on the selected negotiation nodes.

In this embodiment of this disclosure, the blockchain system selects the negotiation nodes based on the status and the height and consensus stage of the nodes, and stops generating the key when the quantity of negotiation nodes does not meet a condition, thereby avoiding an error in the consensus process as a result of a mismatch between the generated key and the blockchain consensus process, and improving stability of the blockchain.

In some embodiments, based on the foregoing technical solution, the key generation information includes a threshold key identifier and an elliptic curve type. In the foregoing operations, after the first proposal request is generated through the first master node, the first proposal request including the key generation information and the negotiation node list, the solutions of the embodiments of this disclosure further include the following operations. First, commitment information of the first master node is generated based on the threshold key identifier and the elliptic curve type in the key generation information. Then an auxiliary shard is generated for each consensus node in the blockchain based on the threshold key identifier and the elliptic curve type in the key generation information.

In this embodiment of this disclosure, the key generation information includes the threshold key identifier and the elliptic curve type. The key generation information includes a consensus node list (i.e., a verifier set, which is obtained by the consensus nodes), a curve type (which may be specified by a chain configuration or by a transaction parameter) used by a threshold key, and a globally unique threshold key ID. After generating the first proposal request through the first master node, the blockchain system further generates the commitment information and the auxiliary shard through the first master node. In other words, the first master node is also a negotiation node, and the first master node also appears in the negotiation node list. The threshold key identifier in the key generation information is an identifier for identifying the generated negotiation key, and the threshold key identifier is unique in an entire blockchain. The elliptic curve type is configured for indicating an elliptic curve used in an elliptic curve encryption method for generating the commitment information and the auxiliary shard. Based on the threshold key identifier and the elliptic curve type, the blockchain node generates the commitment information of the first master node through the first master node. The commitment information is public and the same for all nodes. The commitment information is mainly configured for proving that the first master node is honest in the process of generating the commitment information and the auxiliary shard, and the method adopted is a method agreed upon between the negotiation nodes. The first master node further generates an auxiliary shard for each consensus node. The auxiliary shard generated for each consensus node is different. In some embodiments, information such as an identifier of the consensus node may be used as an additional input for generating the auxiliary shard.

In this embodiment of this disclosure, an implementation of generating a negotiation key is provided, which is beneficial to operability of the solution.

In this embodiment of this disclosure, based on the foregoing technical solution, in the foregoing operation, after the first proposal request is broadcast to the consensus node in the blockchain, the solutions of the embodiments of this disclosure further include the following operations. First, the first proposal request is received through the consensus node in the blockchain. Then it is determined, based on the negotiation node list in the first proposal request, that a target consensus node in the negotiation node list is the negotiation node. Finally, commitment information of the target consensus node and the auxiliary shard for each consensus node in the blockchain are generated based on the key generation information.

In this embodiment of this disclosure, after receiving the first proposal request, the consensus node in the blockchain determines, based on the negotiation node list in the first proposal request, whether the consensus node is a negotiation node. If the consensus node is found in the negotiation node list, the consensus node determines that the consensus node is the negotiation node. After it is determined that the consensus node is the negotiation node, based on the key generation information in the first proposal request, the commitment information of the consensus node is generated, and the corresponding auxiliary shard is generated for each consensus node in the blockchain. A specific manner of generating the commitment information and the auxiliary shard is the same as the foregoing manner. Details are not described herein again.

In this embodiment of this disclosure, based on the foregoing technical solution, in the foregoing operations, after the commitment information of the target consensus node and the auxiliary shard for each consensus node in the blockchain are generated based on the key generation information, the solutions of the embodiments of this disclosure further include the following operations. First, the commitment information and the auxiliary shard generated for the consensus node are respectively encrypted through a node public key of each consensus node, to correspondingly obtain encrypted commitment information and an encrypted auxiliary shard. Then the encrypted commitment information and the encrypted auxiliary shard are transmitted to each consensus node.

Figure 5:
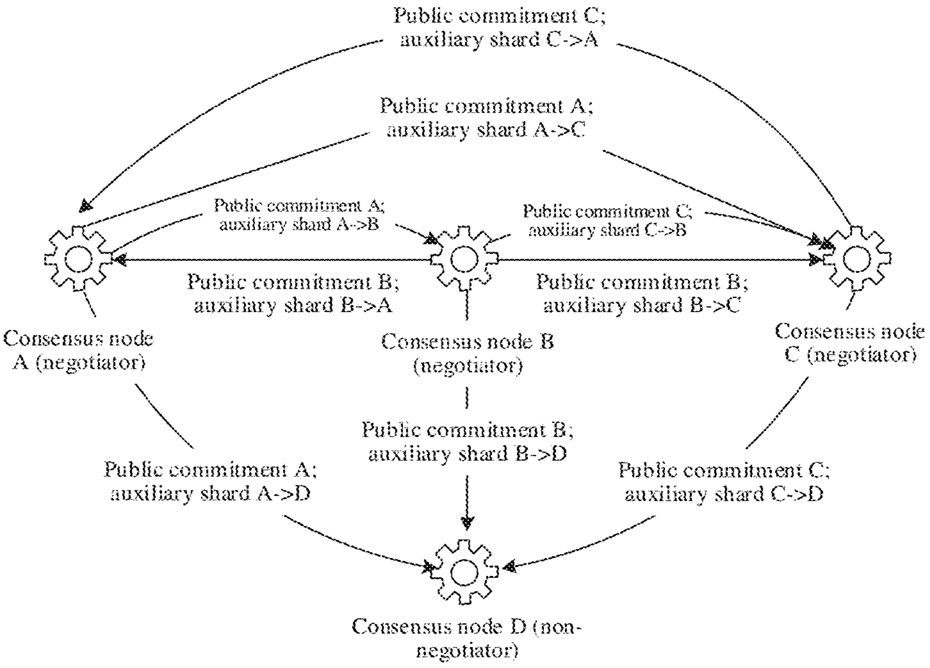
FIG. 5 is a schematic diagram of transmitting commitment information and auxiliary shards according to an embodiment of this disclosure.

In this embodiment of this disclosure, each consensus node transmits the generated commitment information and auxiliary shard to the corresponding consensus node after generating the commitment information and the auxiliary shard. The blockchain system first encrypts the commitment information generated by the consensus node and the auxiliary shard generated by another consensus node through the node public key of each consensus node, to obtain the encrypted commitment information and the corresponding encrypted auxiliary shard. The node public key is not the key generated by the consensus node through the key negotiation process, but a public/private key of the consensus node for information verification and authentication. Subsequently, the blockchain node transmits the encrypted commitment information and the corresponding encrypted auxiliary shard to each consensus node. FIG. 5 is a schematic diagram of transmitting commitment information and auxiliary shards according to an embodiment of this disclosure. As shown in FIG. 5, a negotiator in a consensus node generates a public commitment and auxiliary shards for various other formula nodes. A consensus node A is used as an example. The consensus node A generates a corresponding auxiliary shard for each of consensus nodes B, C, and D, and further generates a public commitment A. Subsequently, the consensus node A encrypts the public commitment A and an auxiliary shard A→B generated for the consensus node B through a node public key of the consensus node B, and transmits encrypted information to the consensus node B. The consensus node B may decrypt the received encrypted information based on a node private key, so as to obtain the public commitment A and the auxiliary shard A→B to facilitate subsequent operations. However, since another consensus node does not have the node private key of the consensus node B, the another consensus node cannot obtain the auxiliary shard A→B even if the another consensus node obtains a message transmitted by the consensus node A to the consensus node B. The same is true for a message transmitted by the consensus node A to the another consensus node and a message transmitted between other consensus nodes. A message to be transmitted is encrypted by using a node public key of a message receiver, thereby ensuring that only the message receiver possessing the node private key can perform decryption to obtain content of the message. In FIG. 5, the consensus node D is a non-negotiator. Therefore, the consensus node receives public commitments and auxiliary shards from the consensus nodes A, B, and C as negotiators, but does not generate a public commitment and an auxiliary shard for another node. As a participant in the consensus process, the consensus node D needs to use the negotiation key generated in the negotiation process. Therefore, although the consensus node D does not provide information about key generation, the consensus node still participates in a voting process about whether to enable the key.

In this embodiment of this disclosure, the message to be transmitted is encrypted by the node key of the receiver, to prevent the content of the transmitted message from being exposed to a third party other than the receiver, thereby improving information security of the negotiation process.

In this embodiment of this disclosure, based on the foregoing technical solution, in the foregoing operation S340, the generating the negotiation key used by the first master node in the blockchain based on the commitment information and the auxiliary shard may be implemented in the following manners. A timer is set after the first proposal request is broadcast to the consensus node in the blockchain. If the commitment information transmitted by all negotiation nodes and the auxiliary shards generated by all the negotiation nodes for the first master node are received before the timer expires, a negotiation public/private key pair of the first master node and a master public key of the blockchain are generated based on the commitment information of all the negotiation nodes and the auxiliary shards of all the negotiation nodes, the negotiation public/private key pair of the first master node and the master public key of the blockchain forming the negotiation key.

In this embodiment of this disclosure, the blockchain system sets a timer after broadcasting the first proposal request through the first master node. Other negotiation nodes need to transmit the generated commitment information and auxiliary shards to the first master node before the timer expires. The same is true for another negotiation node, which sets a corresponding timer when processing the received first proposal request through the negotiation node. If the commitment information transmitted by all the negotiation nodes and the auxiliary shards generated by all the negotiation nodes for the first master node are received before the timer expires, the blockchain system generates the negotiation public/private key pair of the first master node and the master public key of the blockchain based on the commitment information of all the negotiation nodes and the auxiliary shards of all the negotiation nodes, thereby obtaining the negotiation key. The master public key is a key configured for verification. In the consensus process, each consensus node signs a consensus result by using a negotiation private key thereof, and transmits the signed consensus result to the master node. The master node does not need to verify signatures for consensus results one by one while collecting the consensus results. Instead, after more than a threshold quantity (a threshold value being specified when a threshold signature key is generated, and assuming that a total quantity of consensus nodes is n, the threshold value being generally set to $\frac{2}{3}n+1$ in a consensus) of consensus results are collected, the master node synthesizes a signature, which may be considered as being written through a logical master private key, from more than a threshold quantity of signature shards carried in the consensus results, and then verifies the signature once by using the master public key. If the synthesized signature is verified, the signatures of all the consensus results are considered valid. If the verification fails, the signatures in all the received consensus results need to be verified one by one by using the negotiation public key of the consensus node.

In this embodiment of this disclosure, time constraints are imposed on the key negotiation process through the timer, so as to avoid affecting generation efficiency of a block in the blockchain as a result of excessively long negotiation time for key generation, which is beneficial to smooth operation of the blockchain.

In some embodiments, based on the foregoing technical solution, in the foregoing operation S340, the transmitting the voting information to the second master node may be implemented in the following manners. The negotiation public/private key pair and the master public key are saved to a local memory if the negotiation public/private key pair and the master public key of the blockchain are successfully generated through the first master node. Positive vote information for the first proposal request is transmitted to the second master node if the negotiation public/private key pair and the master public key are successfully saved to the local memory. Negative vote information for the first proposal request is transmitted to the second master node if the negotiation public/private key pair and the master public key fail to be saved to the local memory.

In some embodiments, based on the foregoing technical solution, in the foregoing operation S340, the transmitting the voting information to the second master node may further be implemented in the following manners. Negative vote information for the first proposal request is transmitted to the second master node if the commitment information transmitted by all the negotiation nodes and the auxiliary shards generated by all the negotiation nodes for the first master node have not been received before the timer expires.

Figure 6:
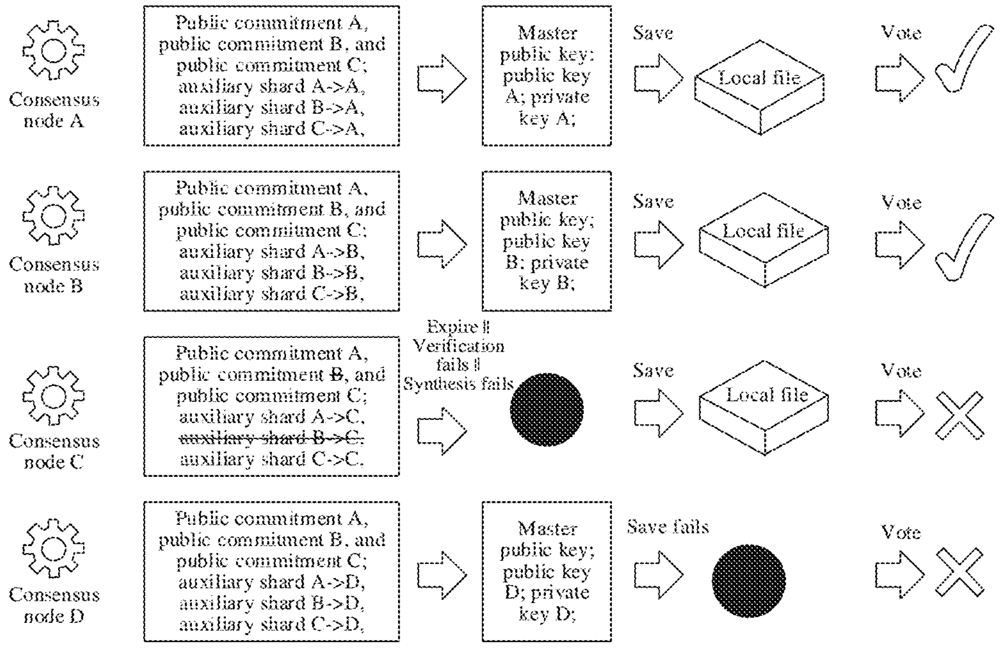
FIG. 6 is a schematic diagram showing that a consensus node processes a first proposal request according to an embodiment of this disclosure.

In this embodiment of this disclosure, if the consensus node successfully generates and saves the master public key and the negotiation public/private key pair, a positive vote is cast for the second master node. If the master public key and the negotiation public/private key pair are not generated, or the master public key and the negotiation public/private key pair are generated, but fail to be stored locally due to an error occurring during saving, a negative vote is cast for the second master node. The positive vote means that a consensus node for voting can use a new negotiation key to perform the consensus signing process, and the negative vote means that the consensus node for voting cannot use the new negotiation key for consensus. For ease of description, FIG. 6 is a schematic diagram showing that a consensus node processes a first proposal request according to an embodiment of this disclosure. As shown in FIG. 6, consensus nodes A and B receive auxiliary shards generated for them by all negotiators (nodes A, B, and C) and public commitments thereof, successfully synthesize a master public key and negotiation public/private key pairs thereof, and successfully save private information to a local file system. In this case, the consensus nodes A and B may cast positive votes for a proposal request. If the consensus node C has not received the public commitment of the consensus node B and the auxiliary shard generated by the consensus node B within a limited time due to various reasons such as a network, and fails to generate the master public key and the negotiation public/private key pair before a timer expires, the consensus node C casts a negative vote for the proposal request. If the consensus node D successfully synthesizes the master public key and the negotiation public/private key pair thereof, but fails to save the private information to the local file system due to a local reason, the consensus node D cannot use a negotiation key generated in a current round, and therefore casts a negative vote for the proposal request.

In this embodiment of this disclosure, a specific scheme for voting on the proposal request is provided, which is conducive to operability of the scheme.

In some embodiments, based on the foregoing technical solution, in the foregoing operation S340, after the negotiation key used by the first master node in the blockchain is generated based on the commitment information and the auxiliary shard, and the voting information is transmitted to the second master node, the solutions of the embodiments of this disclosure further include the following operations. First, a second proposal request is generated based on the received voting information if the voting information received through the second master node meets a key update condition, the second proposal request including all the received voting information. Then the second proposal request is broadcast to the consensus node in the blockchain.

In the solutions of the embodiments of this disclosure, the blockchain system is to continuously verify, through the second master node, whether the voting information received by the second master node meets the key update condition. The key update condition usually means that whether positive votes cast by more than a threshold quantity of nodes for the first proposal request have been received. If a sufficient quantity of positive votes are received, the blockchain system generates the second proposal request based on the received voting information. In some embodiments, the second master node generates a valid voting result based on all the voting information. The voting result includes all the voting information, and then the second proposal request is generated based on the voting result. In addition, public information to be uploaded is constructed in the second proposal request. The public information usually includes information such as a threshold key identifier, a verifier set, a negotiator set, a curve type for generating a key, a master public key, public commitments of all negotiators, and a negotiation public key that has successfully joined a consensus. Then the blockchain system broadcasts the second proposal request through the consensus node in the blockchain of the second master node, so that the consensus node enables a new key based on the second proposal request. Only the consensus node that casts the positive vote enables a new negotiation key, and the consensus node that casts the negative vote waits for a next key update to update the key, or wait until local information is successfully saved to enable the new negotiation key.

In this embodiment of this disclosure, a proposal request for triggering each node to apply a new key is generated through the second master node, so that the communication process can be performed through the master node serving as the master node in turn, without the need for a consensus node that is not a master node to perform an additional communication process, which is beneficial to save communication resources of the blockchain.

In some embodiments, based on the foregoing technical solution, after the second proposal request is broadcast to the consensus node in the blockchain, the solutions of the embodiments of this disclosure further include the following operations. First, the second proposal request is received. Then the second proposal request is uploaded to the blockchain, and a generated master key and the negotiation public/private key pair are enabled. Finally, an invalid master key and an invalid negotiation public/private key pair that are locally saved are deleted.

Figure 7:
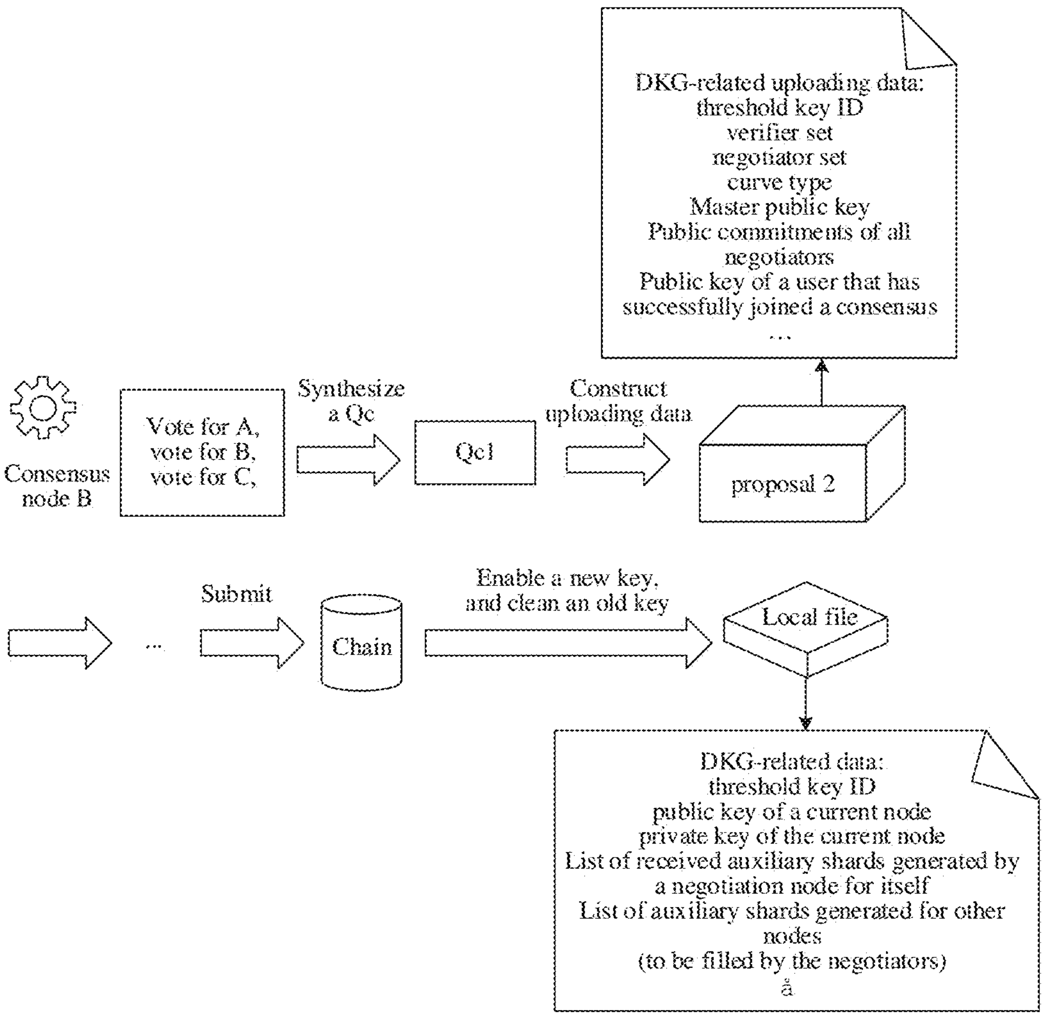
FIG. 7 is a schematic diagram of a key enabling process according to an embodiment of this disclosure.

In this embodiment of this disclosure, after the second proposal request is broadcast, the blockchain system receives the second proposal request through another consensus node, and enables a new key based on the second proposal request. The second proposal request that is broadcast is subjected to a consensus process of each consensus node in the blockchain. In the consensus process, a plurality of proposals are usually generated, and several master nodes are switched. After a consensus is reached, the second proposal request on which a consensus has been reached is further replaced with a proposal uploading request for transaction uploading. The consensus node that receives the proposal uploading request for uploading a transaction uploads public information in the second proposal request in a locally stored blockchain, enables the generated master key and the negotiation public/private key, and also deletes the invalid master key and the invalid negotiation public/private key pair that are locally saved. The consensus nodes further store local information related to the keys. The local information usually includes a threshold key identifier, a public/private key pair of a current node, and a list of received auxiliary shards generated by all negotiators for themselves. For the negotiator, the local information further includes a list of auxiliary shards generated for all nodes as negotiators. For ease of description, FIG. 7 is a schematic diagram of a key enabling process according to an embodiment of this disclosure. As shown in FIG. 7, a consensus node B serves as a second master node, forms a quorum certificate Qc with votes of consensus nodes A, B, C, and the like, constructs data to be uploaded based on the Qc, and adds the data to a second proposal request proposal2. The second proposal request is submitted to a blockchain and uploaded through a consensus process. In this case, a node in the blockchain enables a new key, cleans an old key, and stores information required by each node in a local file.

In this embodiment of this disclosure, a blockchain node enables a new negotiation key after a second proposal is uploaded, thereby obtaining a notification of enabling the new key during the uploading, without a need for a separate message to notify, thereby avoiding a consensus failure as a result of information congestion occurring in the blockchain and a key usage error caused by asynchronous notification, thereby improving stability of the system.

Although various operations of the method in the embodiments of this disclosure are described in a specific order in the accompanying drawings, this does not require or imply that the operations need to be performed in the specific order, or all the operations shown need to be performed to achieve the expected result. Additionally or alternatively, some operations may be omitted, a plurality of operations may be combined into one operation for execution, and one operation may be decomposed into a plurality of operations for execution, and the like.

Figure 8:
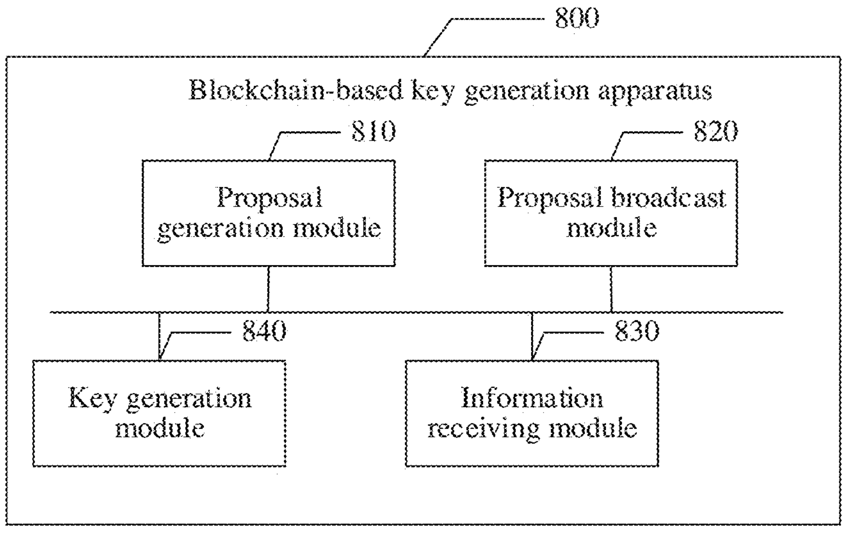
FIG. 8 is a block diagram of composition of a blockchain-based key generation apparatus according to an embodiment of this disclosure.

An apparatus embodiment of the embodiments of this disclosure is described below, which may be configured to perform the blockchain-based key generation method in the foregoing embodiments of this disclosure. FIG. 8 is a block diagram of composition of a blockchain-based key generation apparatus according to an embodiment of this disclosure. As shown in FIG. 8, a blockchain-based key generation apparatus 800 includes: a proposal generation module 810, configured to generate a first proposal request, the first proposal request including key generation information and a negotiation node list, negotiation nodes in the negotiation node list being determined from consensus nodes of a blockchain; a proposal broadcast module 820, configured to broadcast the first proposal request to each of the consensus nodes in the blockchain, and generate commitment information and an auxiliary shard for each consensus node based on the key generation information through each of the negotiation nodes in the negotiation node list; an information receiving module 830, configured to receive the commitment information transmitted by the negotiation node and the auxiliary shard generated by the negotiation node for the first master node; and a key generation module 840, configured to generate, based on the commitment information and the auxiliary shard generated for the first master node, a negotiation key used by the first master node in the blockchain, transmit voting information to a second master node, and generate a second proposal request based on the voting information through the second master node, the second proposal request being configured for triggering the consensus node in the blockchain to enable the negotiation key.

Here, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

In some embodiments, the proposal generation module 810 is further configured to: detect a quantity of consensus nodes in the blockchain; and add, when a proposal request is generated through the first master node, the key generation information and the negotiation node list to the proposal request if a change in the node quantity is detected, to obtain the first proposal request.

In some embodiments, the proposal generation module 810 is further configured to: select negotiation nodes from the consensus nodes in the blockchain when the proposal request is generated through the first master node, to obtain a negotiation node list; obtain the key generation information from the blockchain; and add the negotiation node list and the key generation information to the proposal request generated by the first master node, to obtain the first proposal request.

In some embodiments, the proposal generation module 810 is further configured to: obtain node activity states of the consensus nodes in the blockchain; select, from consensus nodes in an active state based on the node activity states of the consensus nodes in the blockchain, nodes with a same block height and consensus stage as the first master node as negotiation nodes; stop generating a key if a quantity of selected negotiation nodes is less than a threshold quantity of consensus nodes in the blockchain; and generate a negotiation node list based on the selected negotiation nodes if the quantity of selected negotiation nodes is greater than or equal to the threshold quantity of consensus nodes in the blockchain.

In some embodiments, the key generation information includes a threshold key identifier and an elliptic curve type. The key generation apparatus further includes: a first commitment information generation module, configured to generate commitment information of the first master node based on the threshold key identifier and the elliptic curve type in the key generation information; and a first auxiliary shard generation module, configured to generate an auxiliary shard for each consensus node in the blockchain based on the threshold key identifier and the elliptic curve type in the key generation information.

In some embodiments, the key generation apparatus further includes: a first proposal receiving module, configured to receive the first proposal request through the consensus node in the blockchain; a node determination module, configured to determine, based on the negotiation node list in the first proposal request, that a target consensus node in the negotiation node list is the negotiation node; and a shard generation module, configured to generate commitment information of the target consensus node and the auxiliary shard for each consensus node in the blockchain based on the key generation information.

In some embodiments, the key generation apparatus further includes: an encryption module, configured to respectively encrypt the commitment information and the auxiliary shard generated for the consensus node through a node public key of each consensus node, to correspondingly obtain encrypted commitment information and an encrypted auxiliary shard; and an encrypted information transmission module, configured to transmit the encrypted commitment information and the encrypted auxiliary shard to each consensus node.

In some embodiments, the key generation module 840 is further configured to: set a timer after the first proposal request is broadcast to the consensus node in the blockchain; and generate, if the commitment information transmitted by all negotiation nodes and the auxiliary shards generated by all the negotiation nodes for the first master node are received before the timer expires, a negotiation public/private key pair of the first master node and a master public key of the blockchain based on the commitment information of all the negotiation nodes and the auxiliary shards of all the negotiation nodes, the negotiation public/private key pair of the first master node and the master public key of the blockchain forming the negotiation key.

In some embodiments, the key generation module 840 is further configured to: save the negotiation public/private key pair and the master public key to a local memory if the negotiation public/private key pair and the master public key of the blockchain are successfully generated through the first master node; transmit positive vote information for the first proposal request to the second master node if the negotiation public/private key pair and the master public key are successfully saved to the local memory; and transmit negative vote information for the first proposal request to the second master node if the negotiation public/private key pair and the master public key fail to be saved to the local memory.

In some embodiments, the key generation module 840 is further configured to: transmit negative vote information for the first proposal request to the second master node if the commitment information transmitted by all the negotiation nodes and the auxiliary shards generated by all the negotiation nodes for the first master node have not been received before the timer expires.

In some embodiments, the key generation apparatus further includes: a second proposal generation module, configured to generate a second proposal request based on the received voting information if the voting information received through the second master node meets a key update condition, the second proposal request including all the received voting information; and a second proposal broadcast module, configured to broadcast the second proposal request to the consensus node in the blockchain.

In some embodiments, the key generation apparatus further includes: a second proposal receiving module, configured to receive the second proposal request; a second proposal uploading module, configured to upload the second proposal request to the blockchain, and enable a generated master key and the negotiation public/private key pair; and a local key deletion module, configured to delete an invalid master key and an invalid negotiation public/private key pair that are locally saved.

The apparatus provided in the foregoing embodiment and the method provided in the foregoing embodiment belong to the same idea. Specific manners in which the modules perform operations have been described in detail in the method embodiments.

In the embodiments of this disclosure, content of user information is involved, for example, information such as key generation information, a negotiation node list, and commitment information. If data related to user information or enterprise information is involved, when the embodiments of this disclosure are applied to specific products or technologies, user permission or consent needs to be obtained, or the information is blurred to eliminate a correspondence between the information and a user. During example application of the relevant data collection and processing, the informed consent or individual consent of a personal information subject needs to be obtained in strict accordance with the requirements of relevant national laws and regulations, and the subsequent data use and processing behavior is carried out within the scope of authorization of laws and regulations and the personal information subject.

Figure 9:
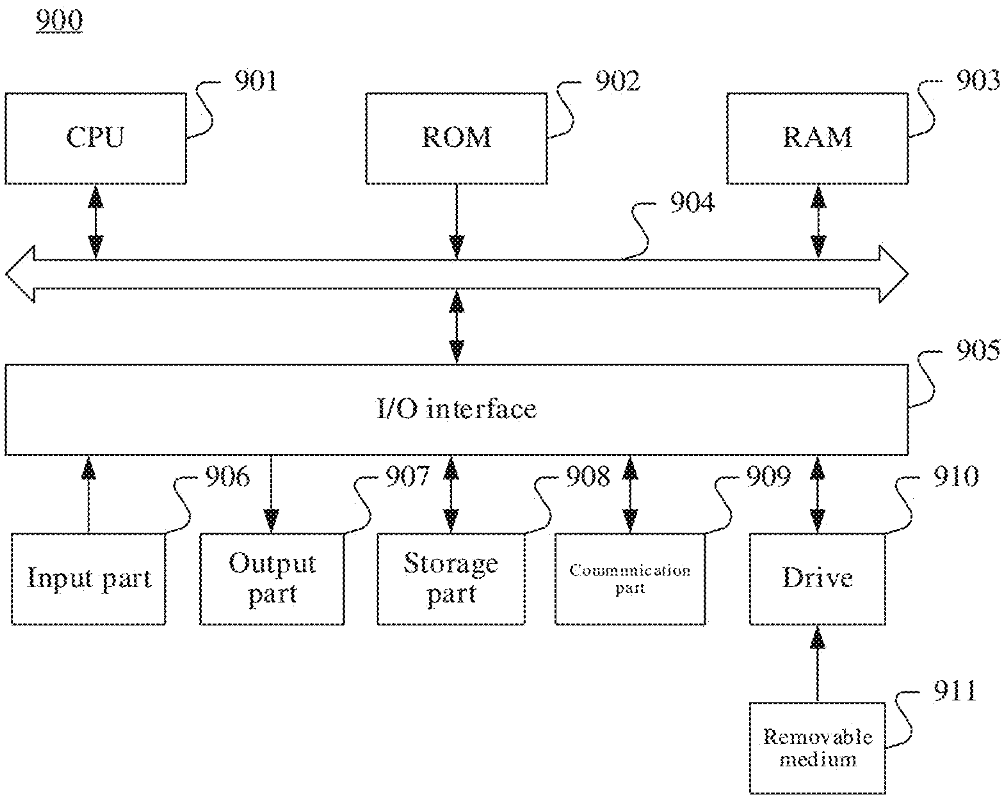
FIG. 9 is a schematic structural diagram of an electronic device according to an embodiment of this disclosure.

In some embodiments, the foregoing first master node for implementing the blockchain-based key generation method may be implemented as an electronic device. FIG. 9 is a schematic structural diagram of an electronic device according to an embodiment of this disclosure. An electronic device 900 shown in FIG. 9 is merely an example, and does not constitute any limitation on functions and usage scope of the embodiments of this disclosure.

As shown in FIG. 9, the electronic device 900 includes a central processing unit (CPU) 901, which may perform various suitable actions and processes based on a program stored in a read-only memory (ROM) 902 or a program loaded from a storage part 908 into a random access memory (RAM) 903. The RAM 903 further has various programs and data required for system operation stored therein. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like; an output part 907 including a cathode ray tube (CRT), a liquid crystal display (LCD), a speaker, or the like; the storage part 908 including a hard disk, or the like; and a communication part 909 including a network interface card such as a local area network (LAN) card and a modem. The communication part 909 performs communication processing by using a network such as the Internet. A drive 910 is also connected to the I/O interface 905 as required. A removable medium 911 such as a magnetic disk, an optical disk, a magneto-optical disk, or a semiconductor memory is installed on the drive 910 as required, so that a computer program read from the removable medium is installed into the storage part 908 as required.

According to the embodiments of this disclosure, the process described in each method flowchart may be implemented as a computer software program. For example, an embodiment of this disclosure includes a computer program product, the computer program product including a computer program carried on a non-transitory computer-readable storage medium, the computer program including program code for performing the methods shown in the flowcharts. In such an embodiment, the computer program may be downloaded and installed from a network through the communication part 909, or installed from the removable medium 911. When the computer program is executed by the CPU 901, various functions defined in the system of the embodiments of this disclosure are performed.

The computer-readable storage medium described in the embodiments of this disclosure may further be a non-transitory computer-readable signal medium or any combination of the above. The computer-readable storage medium may be, for example (but is not limited to) an electric, magnetic, optical, electromagnetic, infrared, or semi-conductive system, apparatus, or device, or any combination of the above. A more specific example of the computer-readable storage medium may include but is not limited to: an electrical connection having one or more wires, a portable computer disk, a hard disk, a RAM, a ROM, an erasable programmable ROM (EPROM), a flash memory, an optical fiber, a portable compact disk ROM (CD-ROM), an optical storage device, a magnetic storage device, or any appropriate combination of the above. In this embodiment of this disclosure, the computer-readable storage medium may be any tangible medium including or storing a program. The program may be used by or in combination with an instruction execution system, apparatus, or device. In this embodiment of this disclosure, a computer-readable signal medium may include a data signal being in a baseband or propagated as a part of a carrier wave, which carries computer-readable program code. A data signal propagated in such a way may have a plurality of forms, including but not limited to, an electromagnetic signal, an optical signal, or any appropriate combination of the above. The computer-readable signal medium may further be any computer-readable medium other than the computer-readable storage medium. The computer-readable medium may send, propagate, or transmit a program used by or in combination with the instruction execution system, apparatus, or device. The program code included in the computer-readable medium may be transmitted using any suitable medium, including but not limited to, a wireless medium, a wired medium, or any suitable combination of the above.

The flowcharts and block diagrams in the accompanying drawings illustrate exemplary system architectures, functions and operations that may be implemented by a system, a method, and a computer program product according to various embodiments of this disclosure. In this regard, each block in the flowchart or the block diagram may represent a module, a program segment, or a part of code. The module, the program segment, or the part of the code includes one or more executable instructions for implementing a specified logical function. In some alternative implementations, functions annotated in the blocks may also be executed in a different order from those annotated in the accompanying drawings. For example, two boxes shown in succession may actually be performed basically in parallel, and sometimes the two boxes may be performed in a reverse order. This depends on the functions involved. Each box of the block diagrams or the flowcharts and combinations of boxes in the block diagrams or the flowcharts may be implemented by a dedicated hardware-based system that performs specified functions or operations, or may be implemented by a combination of dedicated hardware and a computer instruction.

Although a plurality of modules or units of a device configured to perform actions are mentioned in the foregoing detailed description, such division is not mandatory. In fact, according to the implementations of the embodiments of this disclosure, the features and functions of the two or more modules or units described above may be embodied in one module or unit. On the contrary, the features and functions of one module or unit described above may further be divided to be embodied by a plurality of modules or units.

Through the foregoing descriptions of the implementations, a person skilled in the art may readily understand that the exemplary implementations described herein may be implemented by software, or may be implemented by combining software with necessary hardware. Therefore, the technical solutions according to the implementations of this disclosure may be embodied in a form of a software product. The software product may be stored in a non-volatile storage medium (which may be a CD-ROM, a USB flash drive, a removable hard disk, or the like) or on the network, including several instructions for enabling a computing device (which may be a personal computer, a server, a touch terminal, a network device, or the like) to perform the method according to the implementations of this disclosure.

A person skilled in the art can easily figure out other implementations of this disclosure after considering the description and practicing the disclosure that is disclosed herein. This disclosure is intended to cover any variations, usages, or adaptive changes of this disclosure. These variations, usages, or adaptive changes follow the general principles of this disclosure and include common general knowledge or common technical means in the technical field not disclosed in this disclosure.

This disclosure is not limited to the precise structures described above and shown in the accompanying drawings, and various modifications and changes may be made without departing from the scope of this disclosure. The scope of this disclosure is subject only to the appended claims.

What is claimed is:

1. A blockchain-based key generation method, performed by a first master node in a blockchain, the method comprising:

generating a first proposal request, the first proposal request comprising key generation information and a negotiation node list, negotiation nodes in the negotiation node list being determined from consensus nodes of the blockchain;

broadcasting the first proposal request to each of the consensus nodes in the blockchain such that each of the negotiation nodes generates commitment information and an auxiliary shard for each consensus node based on the key generation information;

receiving the commitment information transmitted by the negotiation node and the auxiliary shard generated by the negotiation node for the first master node;

generating, based on the commitment information and the auxiliary shard generated for the first master node, a negotiation key used by the first master node in the blockchain; and transmitting voting information to a second master node such that the second master node generates a second proposal request based on the voting information, the second proposal request being for triggering the consensus node in the blockchain to enable the negotiation key.

2. The method according to claim 1, wherein the generating the first proposal request comprises:

detecting a quantity of consensus nodes in the blockchain; and adding, in response to a change in the node quantity being detected, the key generation information and the negotiation node list to the proposal request to obtain the first proposal request.

3. The method according to claim 2, wherein the adding the key generation information and the negotiation node list to the proposal request comprises:

selecting negotiation nodes from the consensus nodes in the blockchain to obtain a negotiation node list;

obtaining the key generation information from the blockchain; and adding the negotiation node list and the key generation information to the proposal request generated by the first master node to obtain the first proposal request.

4. The method according to claim 3, wherein the selecting the negotiation nodes from the consensus nodes in the blockchain to obtain the negotiation node list comprises:

obtaining node activity states of the consensus nodes in the blockchain;

identifying consensus nodes in an active state based on the node activity states of the consensus nodes in the blockchain;

selecting nodes with a same block height and consensus stage as the first master node from the identified consensus nodes in the active state as negotiation nodes;

stopping generating a key in response to a quantity of selected negotiation nodes being less than a threshold quantity of consensus nodes in the blockchain; and generating a negotiation node list based on the selected negotiation nodes in response to the quantity of selected negotiation nodes being greater than or equal to the threshold quantity of consensus nodes in the blockchain.

5. The method according to claim 1, wherein the key generation information comprises a threshold key identifier and an elliptic curve type, and the method further comprises:

generating commitment information of the first master node based on the threshold key identifier and the elliptic curve type in the key generation information; and generating an auxiliary shard for each consensus node in the blockchain based on the threshold key identifier and the elliptic curve type in the key generation information.

6. The method according to claim 1, wherein after the broadcasting the first proposal request to each of the consensus nodes in the blockchain, the method further comprises:

receiving the first proposal request through the consensus nodes in the blockchain;

determining, based on the negotiation node list in the first proposal request, that a target consensus node in the negotiation node list is the negotiation node; and generating commitment information of the target consensus node and the auxiliary shard for each consensus node in the blockchain based on the key generation information.

7. The method according to claim 6, wherein the method further comprises:

respectively encrypting the commitment information and the auxiliary shard generated for the consensus node using a node public key of each consensus node, to correspondingly obtain encrypted commitment information and an encrypted auxiliary shard; and transmitting the encrypted commitment information and the encrypted auxiliary shard to each consensus node.

8. The method according to claim 1, wherein the generating the negotiation key used by the first master node in the blockchain comprises:

setting a timer after the first proposal request is broadcast to the consensus node in the blockchain; and generating, in response to the commitment information transmitted by all negotiation nodes and the auxiliary shards generated by all the negotiation nodes for the first master node being received before the timer expires, a negotiation public/private key pair of the first master node and a master public key of the blockchain based on the commitment information of all the negotiation nodes and the auxiliary shards of all the negotiation nodes, the negotiation public/private key pair of the first master node and the master public key of the blockchain forming the negotiation key.

9. The method according to claim 8, wherein the transmitting voting information to the second master node comprises:

saving the negotiation public/private key pair and the master public key to a local memory in response to the negotiation public/private key pair and the master public key of the blockchain being successfully generated through the first master node;

transmitting positive vote information for the first proposal request to the second master node in response to the negotiation public/private key pair and the master public key being successfully saved to the local memory; and transmitting negative vote information for the first proposal request to the second master node in response to the negotiation public/private key pair and the master public key failing to be saved to the local memory.

10. The method according to claim 8, wherein the transmitting the voting information to the second master node comprises:

transmitting negative vote information for the first proposal request to the second master node in response to the commitment information transmitted by all the negotiation nodes and the auxiliary shards generated by all the negotiation nodes for the first master node having not been received before the timer expires.

11. The method according to claim 1, wherein the method further comprises:

generating a second proposal request based on the received voting information in response to the voting information received through the second master node meeting a key update condition, the second proposal request comprising all the received voting information; and broadcasting the second proposal request to the consensus node in the blockchain.

12. The method according to claim 11, wherein after the broadcasting the second proposal request to the consensus node in the blockchain, the method further comprises:

receiving the second proposal request;

uploading the second proposal request to the blockchain, and enabling a generated master key and the negotiation public/private key pair; and deleting an invalid master key and an invalid negotiation public/private key pair that are locally saved.

13. A blockchain-based key generation apparatus running on a first master node in a blockchain, comprising:

a memory operable to store computer-readable instructions; and a processor circuitry operable to read the computer-readable instructions, the processor circuitry when executing the computer-readable instructions is configured to:

generate a first proposal request, the first proposal request comprising key generation information and a negotiation node list, negotiation nodes in the negotiation node list being determined from consensus nodes of the blockchain;

broadcast the first proposal request to each of the consensus nodes in the blockchain such that each of the negotiation nodes generates commitment information and an auxiliary shard for each consensus node based on the key generation information;

receive the commitment information transmitted by the negotiation node and the auxiliary shard generated by the negotiation node for the first master node;

generate, based on the commitment information and the auxiliary shard generated for the first master node, a negotiation key used by the first master node in the blockchain; and transmit voting information to a second master node such that the second master node generates a second proposal request based on the voting information, the second proposal request being for triggering the consensus node in the blockchain to enable the negotiation key.

14. The apparatus according to claim 13, wherein the processor circuitry is configured to:

detect a quantity of consensus nodes in the blockchain; and add, in response to a change in the node quantity being detected, the key generation information and the negotiation node list to the proposal request to obtain the first proposal request.

15. The apparatus according to claim 13, wherein the key generation information comprises a threshold key identifier and an elliptic curve type, and the processor circuitry is further configured to:

generate commitment information of the first master node based on the threshold key identifier and the elliptic curve type in the key generation information; and generate an auxiliary shard for each consensus node in the blockchain based on the threshold key identifier and the elliptic curve type in the key generation information.

16. The apparatus according to claim 13, wherein the processor circuitry is configured to:

set a timer after the first proposal request is broadcast to the consensus node in the blockchain; and generate, in response to the commitment information transmitted by all negotiation nodes and the auxiliary shards generated by all the negotiation nodes for the first master node being received before the timer expires, a negotiation public/private key pair of the first master node and a master public key of the blockchain based on the commitment information of all the negotiation nodes and the auxiliary shards of all the negotiation nodes, the negotiation public/private key pair of the first master node and the master public key of the blockchain forming the negotiation key.

17. The apparatus according to claim 16, wherein the processor circuitry is configured to:

save the negotiation public/private key pair and the master public key to a local memory in response to the negotiation public/private key pair and the master public key of the blockchain being successfully generated through the first master node;

transmit positive vote information for the first proposal request to the second master node in response to the negotiation public/private key pair and the master public key being successfully saved to the local memory; and transmit negative vote information for the first proposal request to the second master node in response to the negotiation public/private key pair and the master public key failing to be saved to the local memory.

18. The apparatus according to claim 16, wherein the processor circuitry is configured to:

transmit negative vote information for the first proposal request to the second master node in response to the commitment information transmitted by all the negotiation nodes and the auxiliary shards generated by all the negotiation nodes for the first master node having not been received before the timer expires.

19. The apparatus according to claim 13, wherein the processor circuitry is further configured to:

generate a second proposal request based on the received voting information in response to the voting information received through the second master node meeting a key update condition, the second proposal request comprising all the received voting information; and broadcast the second proposal request to the consensus node in the blockchain.

20. A non-transitory machine-readable media, having instructions stored on the machine-readable media, the instructions configured to, when executed, cause a machine to:

generate a first proposal request, the first proposal request comprising key generation information and a negotiation node list, negotiation nodes in the negotiation node list being determined from consensus nodes of a blockchain;

broadcast the first proposal request to each of the consensus nodes in the blockchain such that each of the negotiation nodes generates commitment information and an auxiliary shard for each consensus node based on the key generation information;

receive the commitment information transmitted by the negotiation node and the auxiliary shard generated by the negotiation node;

generate a negotiation key based on the commitment information and the auxiliary shard generated; and transmit voting information to a second master node such that the second master node generates a second proposal request based on the voting information, the second proposal request being for triggering the consensus node in the blockchain to enable the negotiation key.

* * * * *